United States Patent [19]

Engelke et al.

[11] Patent Number: 4,959,847
[45] Date of Patent: Sep. 25, 1990

[54] TELECOMMUNICATIONS DEVICE WITH AUTOMATIC CODE DETECTION AND SWITCHING

[75] Inventors: Robert M. Engelke; Kevin R. Colwell, both of Madison, Wis.

[73] Assignee: Ultratec, Inc., Madison, Wis.

[21] Appl. No.: 334,003

[22] Filed: Apr. 5, 1989

[51] Int. Cl.$^5$ .......................................... H04L 17/00
[52] U.S. Cl. .................................. 375/121; 178/2 B; 379/98
[58] Field of Search .................. 178/2 B; 341/183, 64; 379/52, 93, 96, 97, 98; 375/10, 121

[56] References Cited

U.S. PATENT DOCUMENTS

| | | | |
|---|---|---|---|
| 3,585,303 | 5/1971 | Chieffo | 379/52 |
| 3,896,267 | 7/1975 | Sachs et al. | 379/52 X |
| 4,012,599 | 3/1977 | Meyer | 379/96 |
| 4,191,854 | 3/1980 | Coles | 379/52 |
| 4,268,721 | 5/1981 | Nielson et al. | 379/52 |
| 4,307,266 | 12/1981 | Messina | 379/52 X |
| 4,426,555 | 1/1984 | Underkoffler | 379/97 |
| 4,650,927 | 3/1987 | James | 379/96 |

OTHER PUBLICATIONS

Radio Electronics, Mar. 1976, pp. 51-58, "ASCII to Baudot" Smith, Roger L.

Primary Examiner—Benedict V. Safourek
Assistant Examiner—Tesfaldet Bocure
Attorney, Agent, or Firm—Quarles & Brady

[57] ABSTRACT

A telecommunications device automatically detects the code used by a second telecommunications device to which the devices are linked to transmit and receive therebetween. After the telecommunications device has been set to transmit and receive in code which has been detected, the telecommunications device continues to interrogate the second telecommunications device for a more optimal code (usually a code with higher transmission and receiving speeds) that is common to both devices.

14 Claims, 2 Drawing Sheets

TELECOMMUNICATIONS DEVICE WITH AUTOMATIC CODE DETECTION AND SWITCHING

FIELD OF THE INVENTION

The present invention relates to a telecommunications device capable of searching, detecting, and switching between different communication codes that may be transmitted.

BACKGROUND OF THE INVENTION

The deaf or hearing-impaired that cannot hear well enough to use the telephone use communication terminals to converse over telephone lines. Such terminals are referred to as telecommunications devices for the deaf or TDDs, and are comprised of a keyboard and display. TDDs are connected to a telephone line through a modem (modulator/demodulator) which allows the terminal to transmit information over a telephone line by coded tones to another eletronic device which is connected to the telephone line through another modem. TDDs were originally equipped to communicate via Baudot code.

As the telecommunications device, computer, and communications industries using ASCII (American Standard Code for Information Interchange) began to offer information and other services, it became desirable to have TDDs capable of operating in ASCII because communication using ASCII is faster, as well as there being other advantages in the use of ASCII. In those countries (such as the European Economic Community) that use CCITT instead of ASCII, it became similarly desirable to use CCITT instead of Baudot. Some TDDs now commercially available have the capability for both Baudot and ASCII (or, alternately, CCITT) available in the same machine. Present TDD multiple code devices include a hardware or software user selected switch to select which code is to be used in the communication. There are three codes now commonly used by TDDs: (1) Baudot at 45.5 baud, (2) Bell 103 ASCII Answer at 300 baud, and (3) Bell 103 ASCII Originate at 300 baud.

Problems often result because the TDD user does not always know whether the TDD, telecommunications device, or other device being used on the other end of the communication is capable of Baudot only, ASCII only, or both. Despite advantages inherent to the ASCII code, most TDD calls are made in Baudot because it is simpler to use and there are no settings that need to be made thus making it more attractive to lay users. To use ASCII code, both parties must agree on who will be in Originate mode and who will be in Answer mode. Optimization of the fastest (highest speed) code available to a particular set of users may also create difficulties. Due to the complexities of ASCII, persons who are not familiar with such codes and technologies are often confused and frustrated in attempting to deal with the many variables involved in determining the optimal code available for each communication and the necessary protocols.

An additional problem in the use of TDDs results when attempting to establish communication with a hearing person. The hearing person who answers the phone may not recognize the call as originating from a TDD because there is no information (codes or other sounds) present on the line when Baudot code is used and no information is currently being transmitted. The result can therefore sustain silence until the hearing party can recognize the situation and convert to the appropriate compatible code. Such a problem might be especially serious in an emergency situation. A similar communication problem may result if the answering party uses a TDD that is set to the noncorrespondent code.

SUMMARY OF THE INVENTION

In accordance with the present invention, a telecommunications device has automatic code detection and switching means. The telecommunications device is capable of detecting automatically which code is being used by a second telecommunications device with which a communications link has been established, and automatically switches to the detected code. The telecommunications device is also capable of continuing to interrogate the second device by the transmission of carrier tones to determine whether the second device is capable of a more optimal code which is common to both devices. The optimal code is usually the code with the highest transmission and reception speeds. The transmission of tones serves the dual purpose of interrogating the second telecommunications device and, in the case of TDD (telecommunications devices for the deaf), cuing a hearing person that a TDD call is on-line, and thus prompting the hearing person to link up with a second telecommunications device.

It is an object of the present invention to provide a telecommunications device which is simple to use.

It is another object of the present invention to provide a telecommunications device having automatic means to search for a compatable communications code and hunt for the optimal communications code.

It is another object of the present invention to provide a telecommunications device capable of communication with other telecommunications devices which are equipped with ASCII-only or Baudot-only.

It is yet another object of the present invention to provide a means that will help hearing persons identify a TDD call.

Further objects, features, and advantages of the invention will be apparent from the following detailed description taken in conjunction with the accompanying drawings.

DESCRIPTION OF THE PREFERRED EMBODIMENT

A telecommunications device according to the present invention would be similar to modern conventional multi-code telecommunications devices for the deaf including a keyboard connected to a microprocessor. The microprocessor is connected to control the operation of an FSK modem integrated circuit which in turn is coupled to a telephone connection. The particular codes created by the FSK modem circuit are selected by the microprocessor which also controls the code used. In prior art devices, the code to be used is generally selected by hardware or software user selected switch. As may be understood by reference to the flowcharts of FIGS. 1 and 2, in the device of the present invention the device automatically seeks for the appropriate code to communicate with a second telecommunication device.

Figure 1:
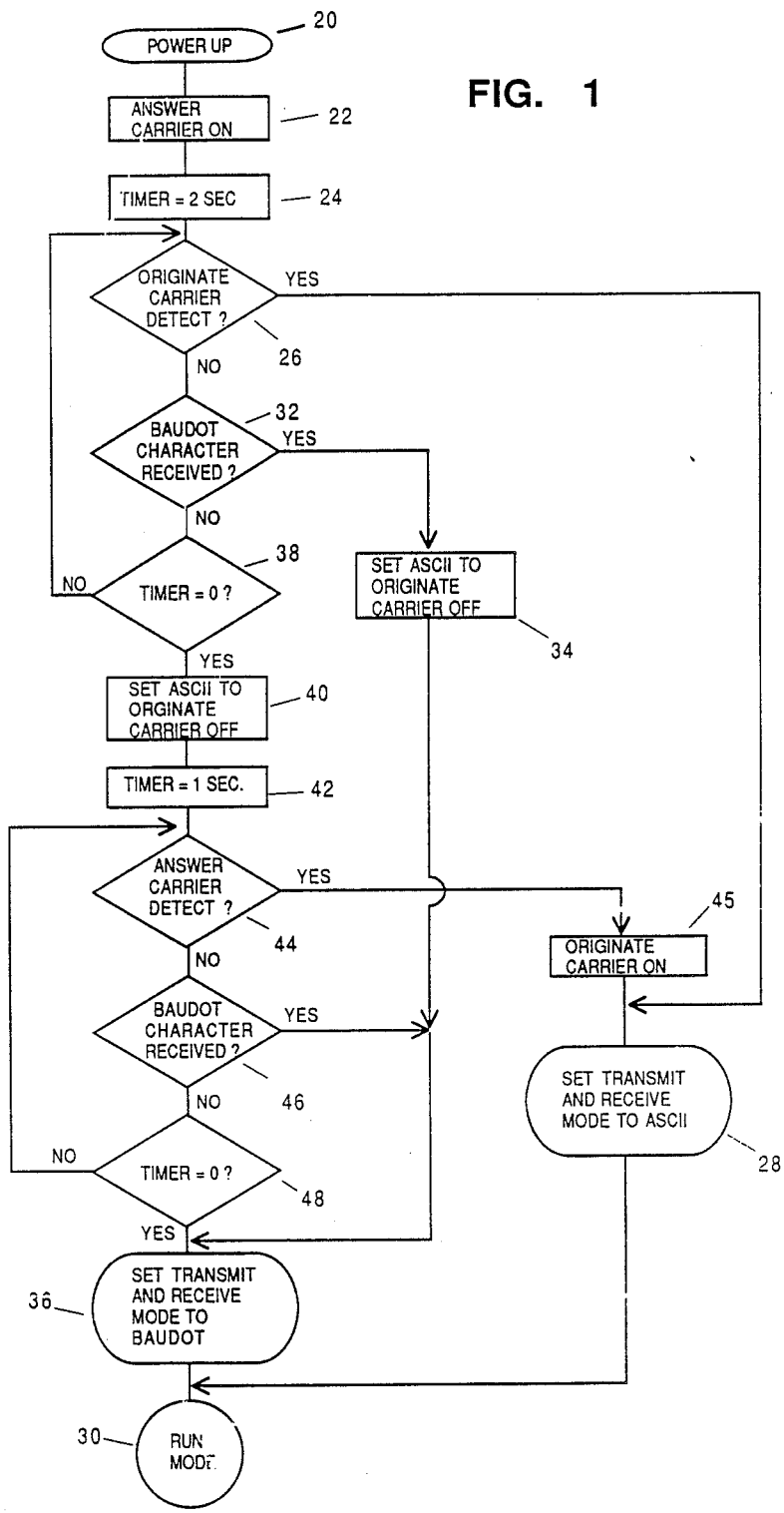
FIG. 1 is a flowchart representing the initialization of the telecommunications device with automatic code detection and switching of the present invention.
Figure 2:
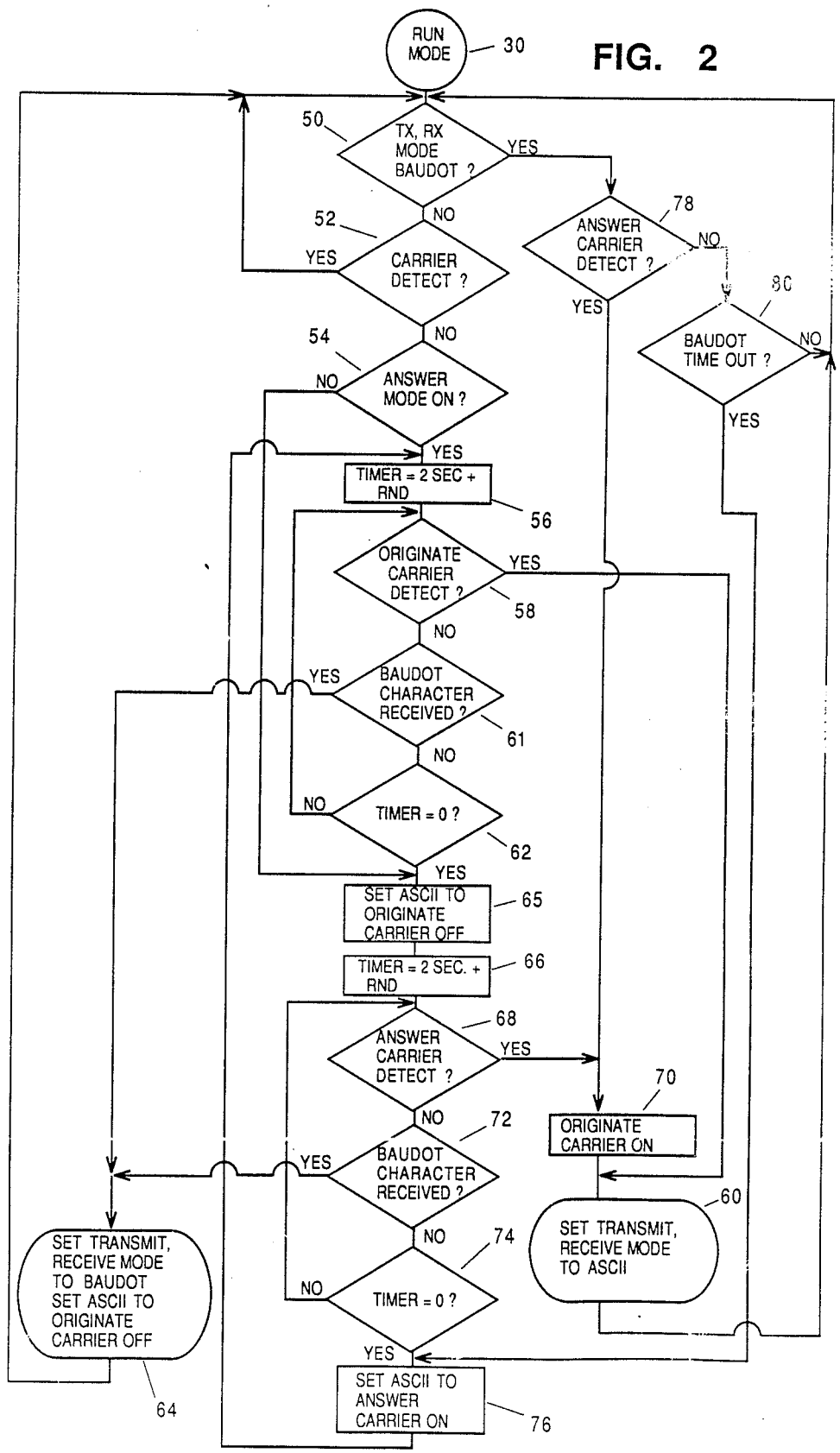
FIG. 2 is a flowchart representing the interrogation performed by the telecommunications device with automatic code detection and switching of the present invention.

With reference to the drawings, FIGS. 1 and 2 show a representation of automatic code detection and switching method for the telecommunications communication device of the present invention. FIG. 1 shows a flowchart of the initialization of the telecommunications device. FIG. 2 shows a flowchart of the interrogation performed by the telecommunications device. The initialization of the telecommunications device acts to automatically detect and switch to a code used by a second telecommunications device; the interrogation performed by the telecommunications device of the second device determines whether the second device is capable of a more optimal code which is common to both devices. For the description that follows, "ASCII Answer code" refers to Bell 103 ASCII Answer at 300 baud and "ASCII Originate code" refers to Bell 103 ASCII Originate at 300 baud.

Upon power up of the telecommunications device at step 20 as shown in FIG. 1, the telecommunications device of the present invention is set to communicate in ASCII Answer mode. A short burst of an ASCII Answer carrier tone (2225 Hz) is transmitted at step 22 to a second telecommunications device to attempt to prompt a response by the second telecommunications device. A timer is then set to 2 seconds at step 24 to provide for an ASCII Answer mode seek time. During this time, the detection circuitry in the telecommunication device checks for a signal in the ASCII Originate passband (1070-1270 Hz) received from the other telecommunications device. If an ASCII Originate signal is detected at step 26 for a predetermined period of time (e.g. 200 milliseconds), the telecommunications device determines the communication code for this transaction to be ASCII Answer code and the telecommunication device remains in this mode. A handshake is thus established in the telecommunications device and the device is then set to transmit and receive in ASCII at step 28, and then continues to the run mode at step 30. The ASCII Originate signal that is detected must be present for a reasonable period of time (a few hundred milliseconds) to prevent voice sounds or noises that pass through this band from causing the telecommunications device to misinterpret such sounds as a particular code, thereby locking into an incorrect code. Such detection time periods shall be referred to as carrier detect times.

If no ASCII originate carrier is immediately received at step 26, the procedure proceeds through a loop of steps 32, 38 and 26 while the timer set at step 24 is counted down. The timer is decremented automatically by separate hardware or software with the device. While waiting to detect an ASCII Originate code and establish an ASCII handshake, the telecommunications device attempts to decode Baudot characters (1400-1800 Hz) at step 32. If a Baudot character is received during this time (i.e. the time established by the timer at 24), the telecommunications device can assume that the other telecommunications device is using Baudot code and the device can then immediately abort looking for ASCII code and set the telecommunications device to communicate using Baudot. To switch immediately to Baudot if a character is received at step 32, the telecommunications device proceeds to set the mode to ASCII Originate with carrier off at step 34, so no carrier is transmitted. At step 36, the telecommunications device is then set to transmit and receive Baudot code. If no Baudot character is detected at step 32, and if the timer has not lapsed at step 38, then the telecommunications device continues to check for a signal in the ASCII Originate passband at step 26, and will simultaneously try to decode Baudot characters at step 32.

If the timer has been found to have lapsed at step 38, the telecommunications device then sets to ASCII Originate mode at 40, in which neither an originate nor answer carrier is transmitted. To get to this step, the telecommunications device must not have found ASCII Originate tones during the Answer mode seek time established by the timer at step 24. The timer is reset at step 42 to one second and the receive circuits are set to look for ASCII Answer tones (2025-2225 Hz). If ASCII Answer tones are detected at step 44 and these tones satisfy the carrier detect time threshold, the telecommunications device determines the code to be an ASCII Answer code and turns on its Originate carrier tone (1270 Hz) at step 45 to establish an ASCII handshake and the telecommunications device is then set to transmit and receive in ASCII at step 28, and then continues with interrogation at step 30.

During this period when the telecommunications device is trying to establish an ASCII handshake by attempting to detect an ASCII Answer carrier, the telecommunications device continues to attempt to decode Baudot characters (1400-1800 Hz) at step 46. If a Baudot character is received during this step 46 (i.e. the time established by the timer at 42), the telecommunications device can assume that the second telecommunications device is using Baudot, immediately abort looking for ASCII, and set the telecommunications device to communicate using Baudot mode at step 30. At step 36, the telecommunications device is then set to transmit and receive Baudot. If no Baudot character is detected at step 46, and if the timer has not lapsed at step 48, then the telecommunications device continues to check for reception of a signal in the ASCII Answer passband at step 44 and will simultaneously try to decode Baudot characters at step 46. If the timer has lapsed at step 48 and ASCII handshake is still not established, the telecommunications device assumes the other machine is using Baudot and sets the telecommunications device to transmit and receive Baudot at step 36, and then continues with interrogation at step 30.

The initialization of the telecommunications device thus locks the device into an initial code assignment, i.e. either ASCII or Baudot. The interrogation as described below attempts to optimize the code used by continuing to search during moments of silence in the communications between telecommunications devices operating in the Baudot mode. Thus the concept is that while operating in the Baudot mode the communication device periodically interrogates the second communication device to inquire if it will communicate in the more efficient ASCII code. Whether or not the device is interrogating for a possible switch to ASCII, it continues to listen for Baudot characters.

Shown in FIG. 2 is the run mode routine to automatically test for code of use. This routine does not include the procedures for the actual transmittal or reception of code characters, but is run during intervals between character reception or transmission to select the proper code. At step 50 in the run mode, the telecommunications device determines whether or not the device is currently set to be transmitting and receiving in Baudot code. At all times the transmit and receive mode must be set to either Baudot or ASCII. If the transmit and receive mode is not set to Baudot as tested at step 50, then it must be set to ASCII. Therefore at step 52 the system tests for the presence of the ASCII carrier. If an ASCII code is present, this routine loops back through step 52 where it will continuously loop remaining in ASCII mode. If an ASCII carrier is not detected at step 52, and if the telecommunications device is set to an ASCII Answer mode at step 54, the device continues to generate an ASCII answer tone. If the device is in an ASCII Answer mode, then a timer is set to 2 seconds plus a random time interval, explained below, at step 56 to establish an ASCII Answer mode seek time. During this time, the circuitry checks for a signal in the ASCII Originate passband received from the second telecommunications device. If an ASCII Originate signal is detected at step 58 for a predetermined period of time sufficiently long to negate noise or conversation, then the telecommunications device determines the code to be ASCII Answer code and the telecommunications device remains in this mode. An ASCII handshake has thus been established in with the second telecommunications device, and the telecommunications device then has its transmit and receive mode set to ASCII at step 60, and then the telecommunications device loops in the routine to step 50 set for ASCII communications. Again, the ASCII Originate signal that is detected must be present for a reasonable period of time (a few hundred milliseconds) to prevent voice sounds or noises that cross through this band from causing the telecommunications device to misinterpret such sounds as a particular code, thereby locking into an incorrect code.

While waiting to detect an ASCII Originate code and establish an ASCII handshake, the telecommunications continues to test for the reception of Baudot characters at step 61. If a Baudot character is received during this time (i.e. the time established by the timer at step 56), the telecommunications device can assume that the second telecommunications device is using Baudot and immediately abort looking for ASCII and set itself to communicate using Baudot. At step 64, the telecommunications device is then set to the transmit and receive mode for Baudot and the routine loops back to step 50. If no Baudot character is detected at step 61, and if the timer has not lapsed at step 62, then the telecommunications device loops to continue to check for a tone in the ASCII Originate passband at step 58 and to continue to simultaneously try to decode Baudot characters at step 6.

Once the timer has lapsed at step 62, the telecommunications device changes its setting from the ASCII Answer carrier mode to the ASCII Originate carrier mode at step 65, in which no carrier is transmitted. The telecommunications device has thus not found ASCII Originate tones during the Answer mode seek time established by the timer at step 56. The timer is reset at step 66 to 2 seconds plus a random time interval, explained below, and the receive circuits are set to look for an ASCII Answer tone. If an ASCII Answer tone is detected at step 68 and the tone satisfies the carrier detect time, the telecommunications device determines the code to be an ASCII Answer tone and turns on its Originate carrier tone at step 70 to establish an ASCII handshake. The telecommunications device has its transmit and receive mode set to ASCII at step 60, and then loops back in the routine to step 50 set for ASCII communication.

During this period when the telecommunications device is trying to establish an ASCII handshake by attempting to detect an Answer carrier, the telecommunications device continues to try and decode Baudot characters at step 72. If a Baudot character is received during this time (i.e. the time established by the timer at step 66), the telecommunications device can assume that the second telecommunications device is using Baudot and can immediately abort looking for ASCII and set itself to communicate using Baudot. At step 64, the telecommunications device has its transmit and receive mode set to Baudot. If no Baudot character is detected at step 72, and if the timer has not lapsed at step 74, then the telecommunications device loops to continue to check for energy in the ASCII Answer passband at step 68 and to simultaneously test for Baudot characters at step 72. If the timer has lapsed at step 74 and ASCII handshake is still not established, the telecommunications device sets the ASCII to Answer mode at 76 with the Answer carrier on for a short burst (e.g. 1–2 seconds) and loops back and continues searching from step 56. Thus the device will continue to loop back testing for ASCII Answer or Originate mode until a carrier is detected or a Baudot character is received.

If the telecommunications device determines at step 50 that the devices are transmitting and receiving in Baudot, then the telecommunications device routine tests at step 78 for an ASCII Answer carrier. If an ASCII Answer carrier is detected, then the Originate carrier is switched on at step 70 and the telecommunications device is set to transmit and receive in ASCII at step 60. If no ASCII carrier is detected, the routine proceeds to step 80 to test for the time-out or time period of a Baudot character. The telecommunications device loops to cycle from step 80. At the end of this time period, after no Baudot character or characters have been received for the predetermined period, the time-out period terminates and the routine branches to step 76 to set the ASCII Answer carrier on to try to switch to ASCII. The telecommunications device routine then continues and loops back to step 56 to hunt for the best mode. In this way, the telecommunciations device repeatedly tries to find if ASCII is present. During the periods of checking for ASCII, the telecommunications device continues to decode Baudot if Baudot characters are received.

If the telecommunications device is in the Baudot mode and is not receiving any characters, the telecommunications device begins to again hunt for the best mode, i.e. ASCII. The time a telecommunications device waits before trying again to find ASCII needs to be different for the two machines. If this were not the case, the two communicating telecommunications device would be looking for the same mode in the same time sequence and fail to establish a handshake. To prevent this, the telecommunications device that last received waits for a slightly longer period then the machine that last transmitted. The difference in the delay time can be set so that the probability that both machines will lock on the first burst of Answer tone generated at 22, 54, or 76 is high.

The short burst of Answer tone present on the telephone line at 22, 54, or 76 is beneficial for reasons other than automatic code detection. Where the telecommunications device is a TDD, the short bursts of Answer tone allow hearing persons or automatic TDD detection equipment to determine the presence of a TDD call. When used by a person with a Baudot only machine (by watching a signal light indicative of code transmissions that is common to TDDs), the presence of an Answer tone during pauses in the conversation confirms that the other party is still on the line. This feature is a significant advantage over prior art Baudot-only TDD devices which, by convention, transmit no tones when information is not being transmitted or received. Thus with prior machines, a hearing person receiving a call from a TDD would hear no sound upon picking up the telephone. With the telecommunications device of the present invention, the person receiving a call would hear the ASCII carrier tones, similar to when a call is placed to an auto-answer modem, so that the person would understand that machine-to-machine communication is intended.

If the telecommunications device at any time locks into an ASCII mode and then looses the handshake tone, the device immediately begins again to look for the correct mode. It is possible that if the handshake is lost both machines will synchronize in their efforts to find the correct mode and never re-establish the handshake. There are several ways to prevent this from happening. First, the order of the search can begin with the last used mode. In this case, the telecommunications device that was last in Answer mode begins its search in Answer mode and the other telecommunications device begins in Originate mode. This helps to re-establish the handshake as rapidly as possible. Another way would be to start the search with a mode determined by the last transmit/receive action of the telecommunications device. For example, if the telecommunications device lost the handshake after last sending a character it will begin its hunt for the correct mode with the ASCII Originate mode. If the telecommunications device was receiving when handshake was lost, the telecommunications device begins its hunt with the ASCII Answer mode. Finally, the seek time for the first cycle of the hunt can be randomized at 56 and 66 so that two machines cannot remain in the same mode for more than one Originate/Answer cycle.

The process of looking for the correct mode by listening for each ASCII mode one after another while trying to receive in Baudot can be extended to allow automatic code detection for standards other than Bell 103 ASCII and Baudot. For example, the telecommunications device can be easily structured to check for Bell 212A ASCII, then Bell 103 ASCII, and then Baudot. This allows the telecommunications device to work in 1200 and 300 Baud ASCII as well as Baudot. A similar sequence can be used for V.24, then Bell 212A, Bell 103, then Baudot. The method of the present invention is equally applicable for the CCITT codes used in other countries, the CCITT codes being substituted for ASCII in the above description. The Bell 103 circuits could be replaced with CCITT V.21 or other CCITT codes. It would also be possible to include both Bell and CCITT circuitry and have the telecommunications device automatically detect between Bell, CCITT, and Baudot codes.

It is understood that the invention is not confined to the particular embodiments herein illustrated and described, but embraces such modified forms thereof as come within the scope of the following claims.

What is claimed is:

1. A method of operating a first telecommunications device so that it will automatically select one of two communication codes for communicating with a remote telecommunications device, a first code being preferred to a second code, the method comprising the steps of:
    (a) upon commencement of operation, the first telecommunications device creating a signal appropriate for communication in the first code and testing for a response from the remote telecommunications device in the first code for a predetermined period of time;
    (b) if a response is received in the first code by the first telecommunications device from the remote telecommunications device during the period of time, the first telecommunications device automatically setting its own mode of communication to the first code;
    (c) if a response is not received in the first code by the first telecommunications device from the remote telecommunications device during the period of time, the first telecommunications device automatically setting its own mode of communications to the second code, and
    (d) if communicating in the second code, during intervals between communications the first telecommunications device automatically creating a signal appropriate for communications in the first code so that communications can be automatically shifted to the first code if and when a proper response in the first code is received from the remote telecommunications device.

2. A method as claimed in claim 1 wherein the second code is Baudot code.

3. A method as claimed in claim 2 wherein the first code is ASCII code.

4. A method as claimed in claim 2 wherein the first code is CCITT code.

5. A method as claimed in claim 1 wherein the first code is ASCII code and wherein in step (a) the step of creating a signal includes transmitting an ASCII answer carrier tone and the step of testing for a response is testing for an ASCII originate carrier tone.

6. A method as claimed in claim 5 wherein step (a) further includes, after creating the ASCII answer signal for a predetermined period of time, creating an ASCII originate signal for a second predetermined period of time and testing for the receipt of an ASCII answer carrier tone.

7. A method as claimed in claim 1 wherein the first code is ASCII code and wherein in step (d) the creating of a signal includes transmitting an ASCII answer carrier tone for a predetermined time period and testing for the receipt of an ASCII originate carrier tone.

8. A method of operating a telecommunications device so that it will automatically select between Baudot code communication and ASCII code communication for communicating with a remote telecommunication device, the method comprising the steps of
    (a) transmitting an ASCII answer carrier tone,
    (b) testing for the receipt of an ASCII originate carrier tone;
    (c) testing for the receipt of information in Baudot code;
    (d) performing steps a, b and c repetitively for a predetermined period of time;
    (e) if no ASCII carrier is detected, or if information is received in Baudot code, the telecommunications device automatically setting its own communication code selection to Baudot code, and (f) if an ASCII originate carrier tone is detected, the telecommunications device automatically setting its own communication code selection to ASCII code.

9. A method as claimed in claim 8 wherein after step (d) there are the further steps of
listening for a second predetermined period of time for an ASCII answer carrier tone; and
if an ASCII answer carrier tone is received, transmitting an ASCII originate carrier tone and setting the communication code selection to ASCII code.

10. A method of operating a telecommunications device so that it will automatically select between Baudot and ASCII codes for communications with a remote telecommunications device with a preference for ASCII code, the method comprising the steps of:
(a) transmitting and receiving information in Baudot code;
(b) during intervals between transmission and reception of Baudot information, the telecommunications device automatically transmitting carrier tones appropriate to ASCII code communication and testing for a responsive tone;
(c) if no responsive ASCII tone is received, the telecommunications device continuing to communicate in Baudot code; and
(d) if a responsive ASCII tone is received, the telecommunications device automatically switching its own mode of communication to ASCII code.

11. A method as claimed in claim 10 wherein the transmitting step (b) includes first transmitting an ASCII answer carrier tone and testing for the receipt of an ASCII originate carrier tone for a predetermined time period.

12. A method as claimed in claim 11 wherein during the predetermined time period also continuing to test for the receipt of information in Baudot code, and if Baudot code information is received, suppressing the ASCII answer carrier tone and continuing communication in Baudot.

13. A method as claimed in claim 11 wherein the transmitting step (b) further includes after the end of the predetermined time period turning off the transmission of ASCII answer carrier tone and then testing for the receipt of an ASCII answer carrier tone for a second predetermined time period.

14. A method as claimed in claim 13 wherein the first and second time periods are randomized so that two different telecommunications devices will use different time periods.

* * * * *